INVENTOR.
JAN GOORISSEN
BY
AGENT

INVENTOR.
JAN GOORISSEN
BY
Frank R. Trifari
AGENT

INVENTOR.
JAN GOORISSEN
BY
Frank R. Trifari
AGENT

INVENTOR.
JAN GOORISSEN
BY Frank R. Trifari
AGENT

United States Patent Office 3,323,954
Patented June 6, 1967

3,323,954

METHOD OF PRODUCING DOPED SEMICONDUCTOR MATERIAL AND APPARATUS FOR CARRYING OUT THE SAID METHODS

Jan Goorissen, Emmasingel, Eindhoven, Netherlands, assignor to North American Philips Company, Inc., New York, N.Y., a corporation of Delaware Filed Apr. 20, 1964, Ser. No. 361,021
Claims priority, application Netherlands, Apr. 19, 1963, 291,753
24 Claims. (Cl. 148—174)

The invention relates to a method of producing doped semiconductor material in which one or more doping materials are converted into vapour or gas and then added to a semiconductor, and further relates to apparatuses for carrying out such a method. It is known to add such doping materials, such as donors and acceptors, in the form of a vapour or a volatile compound to a semiconductor, the compound being decomposed in the latter case. In this process the semiconductor may be in the solid or the molten state, the doping material diffusing or dissolving in the semiconductor. It is also known to deposit a semiconductor and a doping material simultaneously from the gas phase on a support. Thus, both materials may be deposited on a support from the vapour phase in a vacuum or a mixture of gaseous compounds of both materials may be caused to flow past a heated support, the said compounds being thermally decomposed and the doped semiconductor material being deposited on the support. Such known methods may be used in producing semiconductor materials and manufacturing semiconductor bodies or semiconductor electrode systems, such as transistors, diodes and photo-cells.

In such electrode systems the doping materials are generally required to be present in exactly controlled concentrations in the various parts of the semiconductor body used and frequently these concentrations must be different at each individual area. Hence it is of importance for the said known method to be carried out so that the desired amount of the doping material is controllable as accurately as possible and, if desired, is variable. The concentrations of the doping materials in the semiconductor material generally must be small or even minute. The application of the required minute amounts of doping materials from the gas phase, however, frequently is difficult in the known method. For example, in depositing an impurity from the vapour phase in a vacuum, in which process a mass of the doping material is heated, it is difficult to limit the amount of doping material to be deposited to an accurately defined minute value. Furthermore in a gas mixture containing a volatile compound of a doping material it is difficult to reduce the consentration of this compound in the gas mixture to an accurately determined minute value. In addition, in both cases, it is frequently desirable for the supply of a doping substance to be accurately variable during the treatment. This also cannot readily be affected by the known techniques.

To obtain a gas containing a minute concentration of a volatile compound of a doping material, it has already been proposed in a prior copending application, Ser. No. 173,200, filed Feb. 14, 1962, to cause a gas stream to flow past a spark gap, the gas activated by the spark discharge being then caused to flow past a store or supply containing a doping material in the solid state, the gas being of a composition such as to enable it to react in the activated state with the doping material with the formation of a volatile compound of the doping material, after which this volatile compound is entrained by the gas stream. The resulting gas mixture may then be caused to act upon a semiconductor which is heated to a temperature such that the said compound is decomposed. The semiconductor may, for example, be subjected to a doping treatment, for example, to a zone melting treatment. The amount of volatile compound produced may be controlled by regulation or variation of the spacing between the electrodes of the spark gap on the one hand and of the store of the doping material on the other hand, or by adjustment of the spacing between the electrodes of the spark gap. Although this known method enables gas mixtures having low concentrations of doping materials to be produced, it requires a highly accurate adjustment of the said spacings. In addition, when closed systems are used, which generally are necessary to exclude undesirable atmospheric impurities, the adjustment and variation of the said spacings during the process is comparatively complicated.

It is an object of the present invention to provide a method of the kind described in the preamble which does not suffer from the said disadvantages. It is based on the recognition that the eroding action of spark discharges on the material used in a spark electrode system may be utilized. According to the invention, a doping material is converted into the vapour state or gas state with the use of at least one spark electrode system containing the doping material, spark discharges being produced between the electrodes of the spark electrode system. For this purpose, the apparatus for carrying out the invention includes at least one spark electrode system containing a doping material for a semiconductor to be doped and means to produce spark discharged between the electrodes of such a spark electrode system. Prefereably pulse discharges of adjustable frequency are produced between the electrodes of the spark electrode system. After each pulse discharge the electrodes are preferably short-circuited temporarily.

At each discharge a minute amount of the relevant doping material is brought into its ambient atmosphere. The frequency of the pulse discharges used is a measure of the amount of doping material which is converted into vapour or gas per unit of time.

In the spark electrode system employed one of the electrodes may contain the doping material. Preferably all electrodes of a spark electrode system contain the doping material.

The doping material in the elementary state may be sufficiently conductive to be used as the material for an electrode of the spark electrode system. In this case, such an electrode may entirely consist of the doping material. Alternatively an electrically conductive mixture of the doping material and at least one other constituent, for example, an electrically conductive alloy, may be used in an electrode. In order to prevent such other constituent from influencing the properties of the semiconductor material to be produced, a constituent may be chosen which does not preceptibly modify the electrical properties of the semiconductor material to be doped when incorporated therein. The said other constituent may, for example, consist of the same semiconductor as the semiconductor to be doped. Furthermore another constituent may be chosen which in the spark discharge is substantially not vaporized and/or for other reasons cannot reach the area at which the semiconductor is doped. The doping material may also be present in a spark electrode system in the form of a compound with one or more other constituents which for the aforementioned reasons is also able to influence the properties of the semiconductor to be doped. This compound may in itself be sufficiently conductive to be used as the electrode material or it may be mixed with further constituents. At least one electrode of the spark electrode system may also comprise a conductive core, which may consist of one or more constituents or components which for the aforementioned reasons do not influence the properties of the semiconductor to be doped, and a coating containing the doping material. The doping material need not be present in all the parts of the electrodes, but it is sufficient for it to be present in the material of the electrode at the area at which the sparks strike the electrode.

Furthermore it is possible to use more than one spark electrode system while each spark electrode system may contain a different doping material. In order to apply both great and small amounts of the doping material and to regulate these amounts with a high degree of accuracy, two or more spark electrode systems containing the same doping material may be used.

The amount of doping material which is converted into vapour or gas at each spark discharge also depends upon the amount of electric charge which in a spark discharge is transferred from one electrode to the other. This amount is in turn determined by the capacitance between the electrodes and the capacitance connected in parallel with the spark electrode system. A capacitive element of a given capacitance value may be connected in parallel with the spark electrode system. When two or more spark electrode systems containing the same doping material are used, the capacitance value of the capacitive element connected in parallel with each spark electrode system is different for each spark electrode system. Alternatively a capacitive element of variable capacitance value may be connected in parallel with a spark electrode system. This capacitance value need not be continuously variable; it may be discontinuously variable between definite values. A more continuous variation of the amount of doping material converted into vapour or gas by spark discharges per unit of time is obtainable by varying the frequency of the pulse discharges across such a spark electrode system.

The discharge may be effected in a gas containing at least one component the compound of which with the doping material is volatile. The discharge produces not only vaporisation of the doping material but also activation of the gas so that the relevant volatile compound is formed and is entrained by the gas. If in this case the spark electrode system contains other constituents in addition to the doping material, these constituents may be so chosen as to be incapable of forming volatile compounds with the gas. If the gas has a given rate of flow, the concentration of the doping material absorbed by the gas is determined by the number of pulse discharges per unit of time.

Spark discharges across a spark electrode system containing a doping material may also be employed in a vacuum, for example, to deposit small amounts of doping material on a semiconductor body from the vapour phase. The semiconductor to be doped may be heated either during the deposition process or subsequently. In the first case the doping material may be directly diffused into the solid material and/or, when the semiconductor material is at least partly molten be directly dissolved in the melt, while in the second case the impurity may first be deposited on the surface of the body and subsequently may be diffused or dissolved therein. Since by means of the number of pulse discharges an accurate dosage of minute amount of doping material is obtainable, the said method enables, for example, the desired surface concentration of the doping material to be obtained in a layer doped by diffusion, while particularly in order to obtain high-resistance semiconductor material of a given conductivity type an accurately controlled amount of doping material may be added to an amount of molten material.

It has been found that the invention is particularly suitable for use in depositing doped semiconductor material on a support from the gas phase. The support may itself consist of a semiconductor material, for example, in the form of a single crystal, and a material deposited thereon may also obtain a predetermined crystal orientation, for example, the same crystal orientation as that of the support, if the material of the support and the deposited material are isomorphous, for example, consists of the same semiconductor. Deposition may be performed from the vapour phase in a vacuum or by decomposition of gaseous compounds. When doped semiconductor material was deposited by known methods it was difficult to obtain the desired generally minute proportions of the doping material in the deposited material. A further difficulty consisted in producing a desired variation of the said proportion in the direction of thickness of the layer formed by deposition or, when for example two doping materials of opposite type were used, in obtaining two or more adjoining regions of different conductivity types and each having a desired specific conductivity, or in obtaining a desired gradient of this conductivity in the direction of thickness of such a region. In depositing the doped semiconductor from the vapour phase it was known to use a vaporizing vessel containing pure semiconductor material and a vaporizing vessel containing a doping material, however, it was difficult to achieve accurate doping and quick intermediate modifications of the doping concentrations in the depositing material.

A method of depositing a doped layer of semiconductor material on a preheated support by means of thermal decomposition is known in which a mixture of silicon-chloride vapour and hydrogen was caused to flow to a heated support through a pipe into which one or more branch tubes opened which were provided with valves and communicated with vessels filled with volatile chlorides of doping material. Opening such a valve may cause a small amount of vapour of such a compound of a doping material to be entrained by the gas stream in the main pipe. However, it was difficult to regulate the amount of entrained doping materials accurately and reproducibly. The use of the invention not only enables a small concentration of doping material to be accurately controlled in a semiconductor being deposited but also enables the said dosage to be readily varied during deposition, for example, by varying the frequency of the pulse discharges across the spark electrode system, and also two or more doping materials may readily be deposited either simultaneously or in sequence in the desired doses by using several spark electrode systems containing different doping materials and by producing spark discharges across the said spark electrode systems simultaneously, or alternately respectively.

When a semiconductor material is deposited from the vapour phase in a vacuum, a chamber adapted to be evacuated may contain, in addition to a device for vaporizing a semiconductor, which may be in the form of a crucible and means for heating the crucible, one or more spark electrode systems. These spark electrode systems are preferably screened from vapour particles issuing from the heated semiconductor.

When a doped semiconductor material is deposited by means of thermal decomposition a gas stream may be caused to flow past a spark electrode system containing a doping material, the composition of the gas being such that at least one of its constituents is capable of forming a volatile compound with the doping material. Thus, at each spark discharge a small amount of doping material is added to the gas in the form of a volatile compound. The resulting gas mixture may be mixed in known manner with a gas containing one or more volatile compounds of the semiconductor or of the components of the semiconductor. This mixture may subsequently be caused to flow past a heated support in order to achieve deposition of a doped semiconductor material. In order to change the degree of dosage of the doping material, it is not necessary to change the ratio between the gas streams to be mixed but it is sufficient to change the frequency of the pulse discharges across the spark electrode system with a resulting increased accuracy and reproducibility of the dosage. A gas containing the volatile compound or compounds of the semiconductor or of its components may directly be caused to flow past the spark electrode system. In that case it is not necessary to use a gas stream carrying the semiconductor and a gas stream carrying the impurity. Although part of the said volatile compound or compounds may decompose, this amount is so small that the concentration or concentrations of the compound or compounds in the gas is substantially not reduced by the spark discharge. If a semiconductor to be deposited itself consists of a compound or a mixed crystal, a volatile compound of one of the components of the semiconductor may be caused to flow past the spark electrode system.

The invention will now be described more fully with reference to the accompanying drawings and to embodiments given by way of example.

Figure 1:
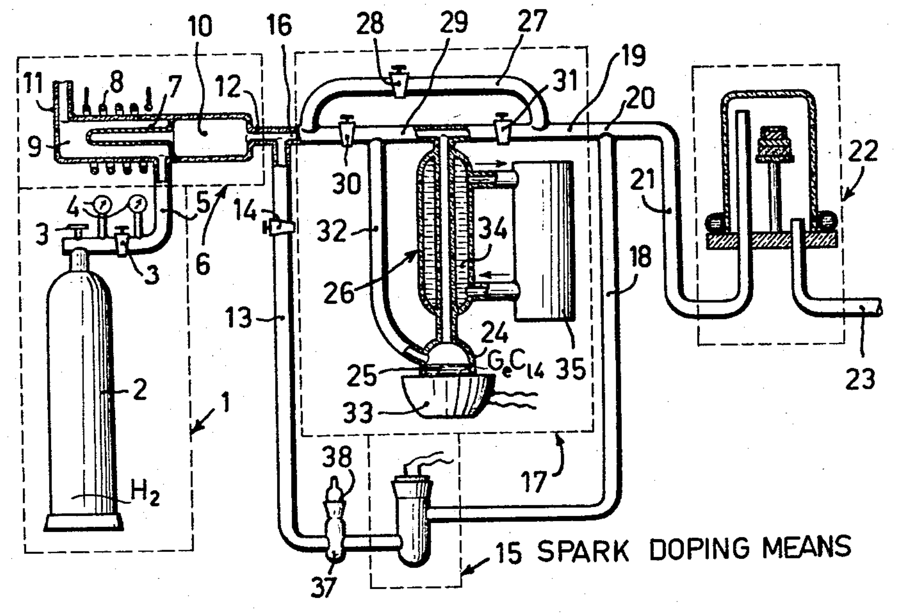
FIGURES 1, 2 and 3 show schematically apparatus for depositing a semiconductor material on a support, in which process at least one doping material may be converted into vapour or gas and may be deposited on a support together with the semiconductor.

In the apparatus shown schematically in FIGURE 1, hydrogen is caused to flow from a supply, which is shown schematically by a frame 1 of broken lines and may comprise a cylinder 2 provided with valves 3 and manometers 4, through a pipe 5 to a purifying device shown schematically a frame 6 of broken lines. This device may be palladium filter 7 in the form of one or more finger-shaped palladium tubes and means for heating this filter, for example, a high-frequency coil 8, as is described in British Patent 916,881. The hydrogen supplied through the pipe 5 under a pressure of about 10 atmospheres flows past a chamber 9. Part of this hydrogen diffuses through the heated palladium filter to a chamber 10, the remaining amount of hydrogen together with the impurities it contains being discharged through a pipe 11. Thus the hydrogen diffused into the chamber 10 is given a high degree of purity. The amount of the hydrogen which is filtered in this manner and the pressure of which is reduced to substantially 1 atmosphere is about 1 litre per minute. From the purifying system 6 the hydrogen is conveyed through a pipe 12 and then is divided, about 175 cc. per minute being supplied through a pipe 13 including a valve 14 to a device which is indicated schematictly by a frame 15 of broken lines and serves to add one or more doping materials to the gas stream with the use of one or more spark electrode systems which contain the doping material or materials to be added, as will be described more fully hereinafter, while the remainder of the hydrogen is supplied through a pipe 16 to a device which is indicated schematically by a frame 17 of broken lines and in which germanium tetrachloride vapour is added to the gas stream.

The device 17 for adding germanium chloride vapour to the stream of hydrogen may be designed in the following manner. It comprises a flask 24 containing liquid germanium tetrachloride 25 and a reflux condenser 26. Hydrogen gas is supplied through the pipe 16. A by-pass pipe 27 permits pure hydrogen to be passed through the device shown in FIGURE 1 for cleaning the apparatus, however, during normal operation of the device this by-pass pipe is closed by means of a valve 28. In normal operation of the device the hydrogen issuing from the pipe 16 flows through a pipe 29, valves 30 and 31 included in this pipe being opened. A pipe 32 branching off from the pipe 29 communicates with the flask 24 containing germanium tetrachloride. The pipes 29 and 32 are proportioned so that one hundredth part of the gas stream supplied through the pipe 16 flows through the pipe 32, the remainder proceeding through the pipe 29. By means of a resistance heater 33 the flask 24 is electrically heated to a temperature above 25° C. but not exceeding the boiling point of germanium tetrachloride (about 83° C.) so as to give the vapour pressure of the germanium tetrachloride in the gas flowing through the flask a value higher than the vapour pressure at 25° C. The gas-vapour mixture produced in the flask is passed through the reflux condenser 26 which is provided with a water jacket 34 through which water of 25° C. circulates via a thermostat 35 shown schematically. As a result the gas mixture is cooled to approximately 25° C., the germanium tetrachloride partly condensing and flowing back to the flask 24, while the gas mixture at the upper end of the condenser consists of hydrogen saturated with germanium tetrachloride vapour having a partial vapour pressure of about 90 mms. of mercury. At its upper end the condenser 26 directly opens into the pipe 29 and the gas mixture issuing from this upper end is mixed with pure hydrogen, the resulting gas vapour mixture leaving the device 17 through a pipe 19.

Figures 4, 5:
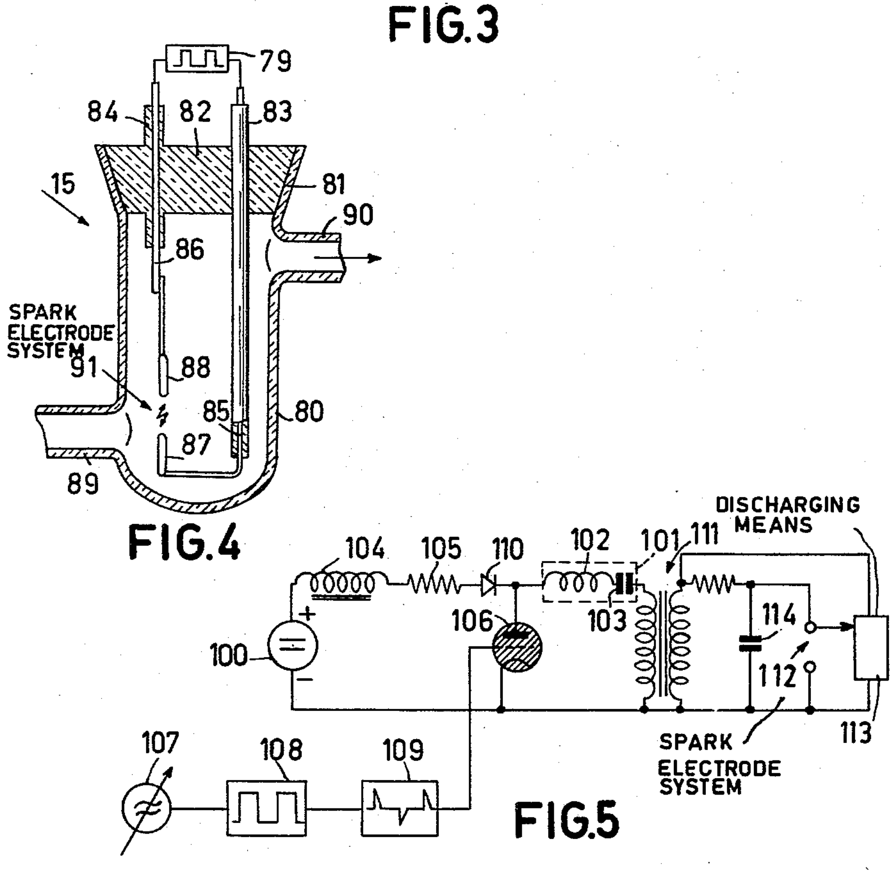
FIGURE 4 shows schematically an apparatus with the aid of which a gas may be caused to flow past a spark electrode system.
FIGURE 5 is a circuit diagram of an arrangement for producing spark discharges across a spark electrode system.

The device 15 for adding a volatile compound of one or more doping materials to a gas may be designed in the manner shown in FIGURE 4. The device comprises a glass vessel 80 the open upper end of which is provided with a ground mouthpiece 81 in which a ground stopper 82 is fitted. Current conductors 85 and 86 which are partly sealed in glass tubes 83 and 84, respectively, pass through the stopper. The ends of these conductors located in the vessel are connected to electrodes 87 and 88 of a spark electrode system 91 which contain a doping material and are spaced apart by a distance of 8 mms. The vessel is provided with a gas inlet pipe 89 and a gas outlet pipe 90. The material of the electrodes depends upon the doping material to be incorporated in a semiconductor. Examples of such electrode materials will be given hereinafter.

By means of a pulse generator 79 the terminals of which are connected to the current conductors 85 and 86, pulsatory voltages at an adjustable or variable frequency may be applied between the electrodes. An example of a circuit diagram for such a pulse generator will be discussed hereinafter with reference to FIGURE 5. Due to the applied pulsatory voltages spark discharges are periodically produced between the electrodes 87 and 88. At each spark discharge a small amount of doping material is vaporized and furthermore the gas flowing through the vessel is temporarily activated, the activated gas reacting with the vaporized doping material to form a volatile compound which is entrained by the gas flowing from the gas inlet 89 to the gas outlet 90 through the vessel 80. The amount of this volatile compound formed per unit of time depends upon the frequency of the pulse discharges between the electrodes. Obviously, the composition of the gas passed through the device of FIGURE 4 must be so chosen that when spark discharges are produced across the spark electrode system 91 a volatile compound of the doping material is formed but that this compound is not formed at room temperature if no spark discharges are produced. The spark discharges produced are such that only the area of the electrodes which is struck by the spark is temporarily heated, the heat generated being substantially entirely dissipated, in the time interval between successive pulse discharges, for example, by heat conduction through the electrodes and/or heat radiation and/or transfer to the gas flowing past.

FIGURE 5 shows a circuit diagram of a pulse generator for producing pulse discharges across a spark electrode system of the kind shown in FIGURE 4. It includes a direct-current source 100 which serves to charge a socalled pulse generating network 101 comprising, for example, an inductor coil 102 and a capacitor 103. One terminal of the direct-current source 100 is connected to the pulse generating network 101 through a choke 104, a charging diode 110 and a resistor 105. Between the junction of the charging diode 110 and the pulse generating network 101 and the earthed terminal of the direct-current source 100 is connected to a normally cut off grid-controlled gas discharge tube 106 which is rendered conductive by current pulses applied to its grid. The said current pulses are produced by a low-frequency oscillator 107 the frequency of which is adjustable and variable. The sinusoidal alternating voltage produced by this oscillator is converted by a converter 108 into an alternating voltage of rectangular shape. A pulsatory alternating voltage is obtained from this square voltage by means of a differentiating network 109 and is applied to the grid of the gas discharge tube 106. The pulse generating network 101 is connected to the primary winding of a pulse transformer 111. A spark electrode system 112, for example the spark electrode system of the device of FIGURE 4, is connected in parallel with the secondary winding of the pulse transformer 111. The spark electrode system 112 is also shunted by a capacitive element 114, which may be a fixed or variable capacitor or several capacitors which may be switched into circuit simultaneously or separately and may be connected in parallel with one another to enable the capacitance to be set to various fixed values and which preferably have different capacitance values.

When a control pulse of positive polarity is applied to the control grid of the gas discharge tube 106, the pulse generating network 101 discharges through the primary winding of the pulse transformer 111 and supplies a voltage pulse for the spark electrode system 112 so that a spark is produced. By means of such a circuit arrangement using a capacitive element 114 (FIG. 5) of 100 pf. a spark discharge having an energy of, for example, about 7 millijoules is produced at each discharge of the gas discharge tube 106 (FIG. 5) between the electrodes 87 and 88 of the spark gap 91 of the device of FIGURE 4.

When the device of FIGURE 4 is used in the apparatus 15 used in the system of FIGURE 1, the method described so far with reference to FIGURE 1 will now be further explained. The two partial streams which have passed through the devices 15 and 17, are again united at 20 when issuing from the pipes 18 and 19. By suitably proportioning the pipes 13 and 18 on the one hand and the pipes 16 and 19 on the other hand, for example, by means of the inclusion of capillary portions (not shown) of suitable diameters, the desired ratio between the values of the partial streams is obtained. The gas obtained after the mixing process at the junction 20 contains hydrogen, germanium tetrachloride and the hydride of an active impurity for germanium. The proportion of the hydride of the doping material depends upon the setting of the circuit arrangement for producing the pulse discharges between the electrodes. The proportion of germanium tetrachloride in the gas mixture is about 0.11% by volume. The gas mixture is supplied through a pipe 21 to a device which is shown schematically by a frame 22 of broken lines and serves to deposit doped germanium on a support, the exhaust gas being discharged from this device through a pipe 23.

Figure 6:
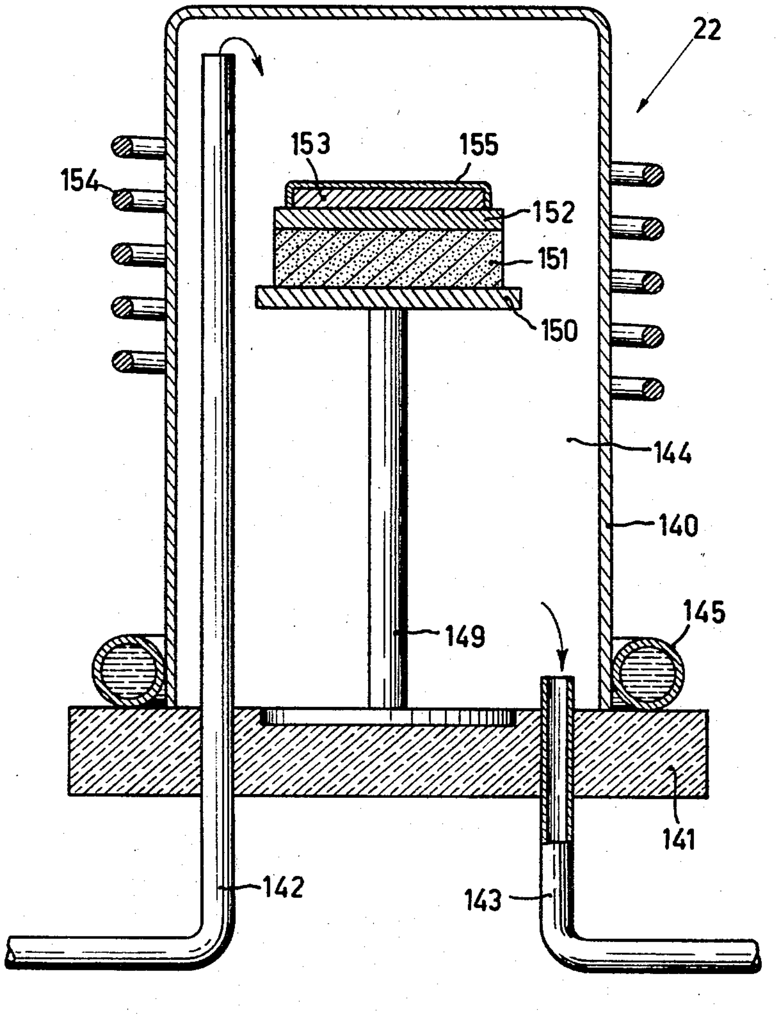
FIGURE 6 shows an apparatus for depositing semiconductor material on a heated support by the decomposition of volatile compounds.

The device 22 for depositing a doped semiconductor on a support may be designed in the manner shown in FIGURE 6. This comprises a bell jar 140 made of vitreous quartz and attached by means (not shown) in a hermetically sealed manner to a base 141 through which are passed a gas inlet pipe 142 and a gas outlet pipe 143. The gas inlet pipe 142 opens into the upper portion and the gas outlet pipe 143 into the lower portion of a space 144 enclosed by the bell-jar 140 and the base 141. A vitreous-quartz stem 149 to which a vitreous-quartz plate 150 is horizontally secured, is vertically mounted on the base 141.

The plate 150 supports a disc 151 of graphite. The disc 151 supports a wafer 152 of highly pure germanium. The wafer supports the support 153 on which the germanium is to be deposited from the gas phase by decomposition. The support may be a monocrystalline germanium wafer. At the level of the plate 150, the disc 151 and the wafers 152 and 153 the bell-jar 140 is encircled by a high-frequency coil 154. The lower end of the bell-jar 140 is encircled by a cooling pipe 145 through which cooling water flows during the operation of the device.

By energizing the high-frequency coil 154 by means of a high-frequency generator (not shown), a high-frequency current having a frequency of 300 kc./s. is sent through the coil 154 so that in the graphite disc 151 induction currents are produced which heat this disc. As a result the wafer 152 and the support 153 are also heated. By proper setting of the high-frequency generator the support is heated to a temperature of about 850° C., the lower portion of the chamber 144 being cooled by means of the cooling pipe 145. A germanium layer 155 is formed on the support 153. The increase in thickness of this layer is about 0.5 micron per minute. In this layer one or more doping materials added to the gas stream in the form of a gaseous compound or compounds by means of spark discharges produced in the device 15 are incorporated in the depositing germanium. The concentration of such a doping material in the depositing germanium depends upon the number of pulse discharges per second across the spark gap 91 (FIGURE 4) containing the relevant doping material.

Examples of the method described with reference to FIGURES 1, 4, 5 and 6 will now be set forth.

In one embodiment, in the device of FIGURE 4 the electrodes 87 and 88 of the spark electrode system 91 are filamentary members comprising a core of tungsten and a coating of elementary boron. Boron is a comparatively poor conductor and hence is not suitable to act as electrode material by itself. The electrodes may be manufactured by heating a tungsten filament in a chamber containing boron bromide, boron being deposited on the filament. The resulting filament may be divided into smaller pieces, each piece having the length of the desired electrodes.

The support 153 of FIGURE 6 is a monocrystalline wafer of n-type germanium. Using a capacitive element 114 (FIGURE 5) of 100 pf. pulse discharge across the spark gap 91 (FIGURE 4) are generated at a frequency of 200 discharges per second. Boron hydride is formed which is entrained by the gas stream. The tungsten does not form a volatile compound.

In this example doped germanium is deposited on the support 153 (FIGURE 6) for 30 minutes. The deposited layer 155, which is 15$\mu$ thick, consists of p-type germanium having a specific resistance of 1.5 ohm-cm.

In another embodiment the procedure is the same as in the preceding embodiment using electrodes comprising a core of tungsten and a coating of boron. In this case, however, halogen vapour is added to the hydrogen flowing through the pipe 13 (FIGURE 1) by inserting a few pieces of iodine in a vessel 37 which is provided with a stopper 38 and is included in the pipe 13. A small amount of iodine vapour is absorbed in the hydrogen flowing past the iodine. At room temperature iodine vapour like hydrogen does not perceptibly react with boron. By means of spark discharges produced between the electrodes 87 and 88 (FIGURE 4) boron iodine is formed. When employing 200 pulse discharges per second across the spark electrode system 91 and a capacitive element 114 (FIGURE 5) of 100 pf., a germanium layer 155 having a specific resistance of 0.5 ohm-cm. is deposited on a germanium wafer 153 of n-type germanium (FIGURE 6).

As an alternative n-type germanium may be deposited on a support 153 consisting, for example, of p-type germanium by using a spark electrode system 91 (FIGURE 4) containing a donor, for example, having electrodes 87 and 88 which contain a phosphide or an arsenide and may, for example, consist of the arsenide or phosphide or indium, gallium or aluminum. It should be noted that it has been found that during the spark discharges substantially no volatile compound of indium, gallium or aluminum is entrained by the gas stream, whereas arsenic or phosphorus in the form of the relevant hydride is added to the gas stream and entrained thereby.

Figure 2:
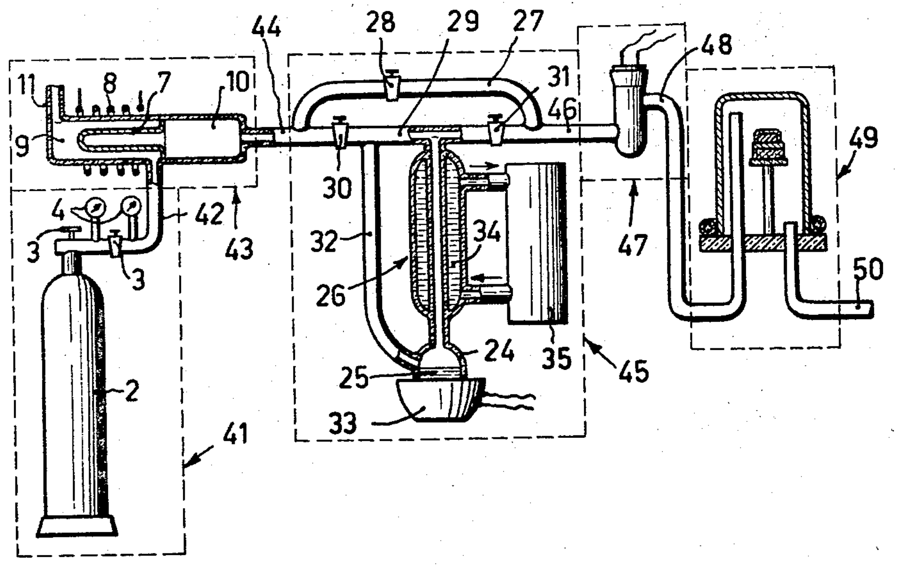

With reference to the system shown in FIGURE 2 it will now be explained how, for example, the method according to the invention in which the spark discharges for adding a doping material to a semiconductor to be deposited on a support are produced in a gas containing the semiconductor to be deposited in the form of a gaseous compound, may be carried out. In the apparatus of FIGURE 2, similar components are denoted by the same reference numerals as are used in FIGURE 1.

In a manner similar to that described hereinbefore with reference to FIGURE 1, hydrogen from a store indicated by a frame 41 of broken lines for example, a hydrogen cylinder 2, is conveyed through a pipe 42 to a purifying system which is indicated schematically by a frame 43 of broken lines and may be a palladium filter of the kind described hereinbefore. A stream of purified hydrogen under about atmospheric pressure is supplied at a rate of 1 litre per minute through a pipe 44 to a device which is indicated schematically by a frame 45 of broken lines and in which silicon chloride vapour is added to the hydrogen gas. This device may be designed in the manner described hereinbefore with reference to FIGURE 1. One hundredth part of the hydrogen stream, that is 0.01 litre per minute, is supplied to the flask 24 through the pipe 32. The flask contains pure liquid silicon tetrachloride ($SiCl_4$) which is heated to a temperature higher than 40° C. but not higher than its boiling point (about 60° C.) so that the vapour pressure of the silicon tetrachloride absorbed by the gas flowing through the flask 24 is given a value higher than the vapour pressure at 40° C. In this case water of 40° C. circulates through the thermostat 35 and the water jacket 34 of the reflux condenser 26. Part of the silicon chloride vapour is condensed in the reflux condenser 26 and flows back to the flask 24. The gas mixture in the upper portion of the flask contains silicon tetrachloride at a vapour pressure of 410 mm. of mercury. The mixture is combined with the remainder of the hydrogen flowing through the pipe 29. This admixture of excess hydrogen prevents silicon tetrachloride from condensing above the reflux condenser. The resulting gas mixture contains about 1.2% by volume of silicon tetrachloride, the remainder being hydrogen.

This gas mixture is supplied through a pipe 46 to a device which is shown schematically in FIGURE 2 by a frame 47 of broken lines and serves to add at least one doping material in the form of a volatile compound to the gas stream by means of spark discharges across at least one spark electrode system, each spark electrode system containing a doping material. The device 47 may be designed in the manner described hereinbefore with reference to FIGURE 4, spark discharges being produced by means of a pulse generator the circuit diagram of which is shown in FIGURE 5. The electrodes 87 and 88 (FIGURE 4) contain a doping material capable of forming a volatile chloride.

The gaseous mixture of hydrogen and silicon chloride flowing through the pipe 46 (FIGURE 2) is supplied to the vessel 80 (FIGURE 4) through the inlet 89 and flows past the spark electrode system 91 comprising the electrodes 87 and 88. If no spark discharges are produced, there is no perceptible reaction between the gas mixture and the electrode. The electrodes 87 and 88 are spaced apart by a distance of 8 mm. By means of the spark generator comprising a capacitive element 114 of 100 pf. spark discharges are produced between the electrodes 87 and 88 (FIGURE 4). By these discharges electrode material is vaporized and also a small portion of the silicon chloride is activated, causing a reaction with the electrode material with the formation of a volatile chloride of the doping material in the electrode material. Free silicon may also be formed and deposited in the vessel 80, however, its amount is so small that the proportion of silicon vapour in the gas mixture remains substantially unchanged. The resulting gas mixture which contains in addition to hydrogen and silicon chloride the volatile chloride of the doping material from the spark electrode system 91, is discharged through the pipe 90.

Through the pipe 48 (FIGURE 2) this gas mixture is conveyed to a device which is indicated schematically in FIGURE 2 by a frame 49 of broken lines and serves to deposit the doped silicon on a support. This device 49 may be designed in the manner described hereinbefore with reference to FIGURE 6, the wafer 152 in this case consisting of pure silicon and doped silicon being deposited on a support 153 consisting, for example, of monocrystalline silicon and heated to a temperature of about 1225° C. The gas mixture which consists of hydrogen, silicon chloride and the chloride of the doping material and is supplied through the pipe 48 (FIGURE 2), flows through the pipe 142 (FIGURE 6) into the chamber 144 and past the heated support 153, a doped silicon layer 155 being deposited at a rate of growth in the direction of thickness of about 1$\mu$ per minute, after which the gas stream through the pipe 143 leaves the device of FIGURE 6 and is discharged through a pipe 50 (FIGURE 2). The concentration of the doping material in the silicon deposit 155 (FIGURE 6) depends upon the number of pulse discharges between the electrodes 87 and 88 of the spark discharge apparatus (FIGURE 4).

A few embodiments of the method described with reference to the apparatus of FIGURE 2 with the use of the devices of FIGURES 4 and 6 will now be set forth.

In the first two embodiments the electrodes 87 and 88 (FIGURE 4) comprise a core of tungsten filament and a coating of boron. When between the electrodes 87 and 88, 2 pulse discharges are produced per second by means of a pulse generator having the circuit arrangement described hereinbefore with reference to FIGURE 5 and comprising a capacitive element 114 of 100 pf., a gas mixture is obtained from which in the device shown in FIGURE 6 a layer 155 of p-type silicon having a specific resistance of 5.9 ohm-cm. is deposited on a support 153 consisting of a wafer of monoline n-type silicon. If 20 pulse discharges are produced across the spark electrode system 91 (FIGURE 4) per second using the same generator and the same capacitive element of 100 pf. the specific resistance of the deposit 155 of p-type silicon will be 1.0 ohm-cm. As an alternative, electrodes of aluminum may be used.

It has been found that when spark discharges are produced in a gas containing the deposited semiconductor in the form of one or more gaseous compounds, in the long run a small amount of semiconductor material may be deposited on one or both of the electrodes. This may not only reduce the spacing between the electrodes so that the circumstances in which the spark discharge takes place are modified, which may influence the amount of compound of the doping material formed per spark discharge, but also, especially if both electrodes are covered with the semiconductor material, no doping material at all may in the long run be added to the gas stream in spite of the spark discharges. It has been found that the train of events together forming each pulse discharge across the spark electrode system is significant for the occurrence of the said phenomena. When pulse discharges are produced by means of the usual circuit arrangements, for example, a circuit arrangement of the type described with reference to FIGURE 5, after the voltage between the electrodes decreases due to the spark discharges an after-current persists across the spark gap by way of the gas and/or vapour particles ionised by the spark and liberated from the electrodes, and this after-current will hereinafter be referred to as "glow discharge." The energy of this glow discharge may even be considerably larger than the energy of the spark discharge in each pulse, for example, about 10 times as large. It has now been found that the deposition of semiconductor material on the electrodes of the spark electrode system may be prevented or at least materially reduced by discharging one of the electrodes of the spark electrode system with respect to the other through its current supply lead immediately after each spark discharge. For this purpose, in the circuit arrangement for producing pulsatory spark discharges described hereinbefore with reference to FIGURE 5, for example, a trigger 113 for instance a monostable trigger may be included which by control of the trailing edge of the spark voltage pulse may be actuated so that an electrode of the spark electrode system 112 is discharged with respect to the other and also the capacitor 114 is discharged. Thus, a glow discharge succeeding the spark discharge is suppressed. Not only has it been found that such a suppression of this glow discharge is of importance when gaseous compounds which by decomposition may bring about the deposition of constituents in the solid state, are passed through, but it has also been found that, even if a gas from which no solid material can form is caused to flow past a spark electrode system containing a doping material, an increase of the amount of doping material entrained at each spark discharge is obtainable. Probably the glow discharge is mainly responsible for the deposition of semiconductor material or other solid materials from the decomposed gas on the electrodes and this glow discharge also causes part of the doping material absorbed in the gas by the spark discharge to re-deposit on the electrodes.

Figure 7:
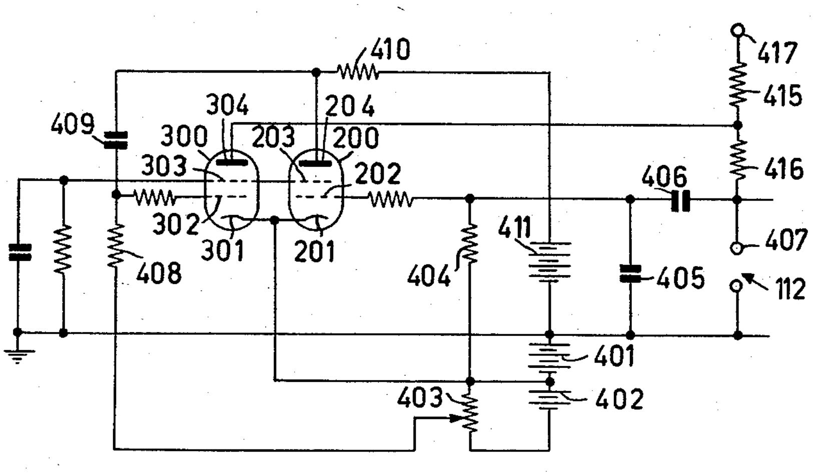
FIGURE 7 shows a circuit diagram of trigger arrangement suitable for use in the spark pulses generating arrangement, the circuit diagram of which is shown in FIGURE 5.

FIGURE 7 shows a circuit arrangement for the trigger 113 (see FIG. 5) as used by way of example, but it is clear that other suitable trigger circuits might be designed, which may be monostable or even bistable when means are present to switch the trigger back to its original state between two subsequent pulses, e.g. by means of the negative pulse from the differentiating network 109 (FIG. 5).

The monostable trigger, the circuit arrangement of which is shown in FIG. 7, comprises two tetrode tubes 200 and 300. The cathodes 201 and 301 of these tubes are connected to the negative terminal of a D.C. voltage source 401 which is also connected to the positive terminal of a second D.C. voltage source 402. A potentiometer 403 is connected across the voltage source 402.

The control grid 202 of tube 200 is connected to the negative terminal of the D.C. voltage source 401 via a resistance 404 and further to an earth-connected capacitive element 405 of high capacitance and also to a capacitive element 406, which is connected to the non-grounded electrode 407 of the spark electrode system 112 of FIG. 5. The capacitance value of the element 406 is low in comparison with the lowest capacitance value which may be given to the capacitive element 114 of FIG. 5 and the capacitance value of the element 405.

The control grid 302 of tube 300 is on the one hand connected to the slider of the potentiometer 403 via a resistance 408 and to a capacitive element 409 which is connected to the anode 204 of tube 200.

The interconnected screen grids 203 and 303 of tubes 200 and 300 respectively are set to earth potential.

The anode 204 is further connected via a resistance 410 of a value which is low in comparison to the resistance 408 to the positive terminal of a D.C. voltage source 411. The anode 304 of tube 300 is connected via a resistance 415 to the non-grounded terminal 417 of the secondary winding of the transformer 111 of FIGURE 5 and via another resistance 416 to the non-grounded electrode 407 of the spark electrode system 112.

In the normal condition the control grid 302 has a potential which is negative with respect to cathode potential and the tube 300 is non-conductive. The control grid 202 has approximately cathode potential and tube 200 is conducting. Due to the electron current in tube 200 and the presence of the resistance 410 the potential of the anode 204 is lower than the potential of the positive terminal of the D.C. source 411.

When a positive pulse is applied to 417 and 407 the following phenomena will occur. When the voltage at 417 is rising which also causes a rise of the voltage of electrode 407, the tube 300 remains non-conductive and tube 200 remains conducting. However, as soon as a spark discharge over the spark electrode system 112 occurs the voltage of electrode 407 quickly drops which results in a negative pulse through the capacitive element 406 to the control grid 202 cutting-off the tube 200. Due to this cut-off the potential of anode 204 quickly rises to the potential of the positive terminal of the D.C. voltage source 411, resulting in a positive pulse through the capacitive element 409 to the control grid 302 which brings tube 300 into the conducting state. The resulting anode current of tube 300 discharges the electrode 407.

However, this new condition of the trigger is unstable as due to currents through the resistances 404 and 408 the control grids are brought to their original voltages after a short lapse of time. Thereby the tube 200 is brought into the conducting state and the tube 300 is cut-off, so that the trigger has returned to its original state.

According to another embodiment of the method described hereinbefore with reference to FIGURE 2, a device as described with reference to FIGURE 4 is used in which the electrodes 87 and 88 consist of antimony. For the suppression of the glow discharge a trigger switch 113 (FIGURE 5) of the kind described is used. The device for depositing semiconductor material on a support, which is described hereinbefore with reference to FIGURE 6, includes a support 153 of p-type silicon. When the gas stream which contains the silicon chloride is doped with antimony chloride by the production of 20 pulse discharges per second across the spark electrode system 91 (FIGURE 4) in which the capacitive element 114 (FIGURE 5) has a capacitance of 100 pf. a layer 155 of n-type silicon having a specific resistance of 0.5 ohm-cm. is deposited on the support 153 (FIGURE 6).

Although in the embodiment described with reference to FIGURES 1 and 2 only a single spark electrode system containing only a single doping material has been described, the invention is not limited thereto. For example, a set of spark electrode systems may be used simultaneously which may convert several doping materials into gases. If required, a vessel containing several spark electrode systems may be provided or several vessels containing spark electrode systems may be arranged either in series or in parallel between the pipes 13 and 18 (FIGURE 1) or between the pipes 46 and 48 (FIGURE 2), for which purpose the said pipes may be provided with branch pipes which may be adapted to be separately closed by means of appropriately mounted valves. Thus, for example, several doping materials may be added to the gas stream either simultaneously or successively, for example, a donor and an acceptor in sequence or an acceptor and a donor in sequence, so that layers of different conductivity types may be deposited on a support in succession. By controlling the number of pulse discharges across each spark electrode system each layer of a given conductivity type may be given a predetermined specific resistance or even a predetermined variation of the specific resistance in the direction of thickness.

It should further be noted that for carrying out the above described method it is not necessary to know the ultimate concentration of the volatile compound of the doping material in the gas mixture. This concentration is so small that it cannot readily be determined. When using a given spark generator having a given capacitance value of the capacitive element connected in parallel with the spark electrode system, a given spark electrode system comprising given electrodes and a given gas stream of given composition are used, it is sufficient to determine the dependence of the specific resistance of a layer of deposited semi-conductor material on the frequency of the pulse discharges in a given apparatus and a given embodiment of the method.

If the use of a single spark electrode system containing a given doping material is not sufficient to cover a desired range of the degree of doping in the semiconductor material to be deposited or to be manufactured in some other manner, several spark electrode systems containing the same doping material may be used, spark discharges being produced either across each spark electrode system separately or across two or more spark electrode systems simultaneously. In this case the capacitances to be connected in parallel with each separate spark electrode system preferably are different. For high degrees of doping a spark electrode system may be used with which a capacitive element having a comparatively high capacitance value is connected in parallel, while for a lower degree of doping spark discharges may be produced across a spark electrode system which is shunted by a capacitive element having a comparatively low capacitance value. As has been set forth hereinbefore, the range of the degree of doping may also be increased by using a capacitive element of variable capacitance value.

In the following examples the influence of the capacitance of the capacitive element shunting the spark electrode system on the conductivity of silicon applied as a layer on a support is shown.

Use is made of an apparatus of the type described with reference to FIGURE 2, with which a gas mixture of about atmospheric pressure is produced comprising hydrogen and 1 vol. percent of silicon tetrachloride. Said gas mixture is carried to the spark dosing apparatus 47 and subsequently to the apparatus 49 for depositing a doped silicon epitaxial layer on a single crystal silicon support 153 (FIG. 6). The velocity of the gas stream is 1 litre per minute. In each experiment the silicon support 153 is first heated in pure hydrogen at about 1275° C. during 30 minutes and subsequently heated in the gas mixture during 15 minutes, a layer 155 with a thickness of about 11$\mu$ being formed.

A spark dosing apparatus of the type described hereinbefore with reference to FIGURE 4 is used. The pulse generator used is of the type the circuit arrangement of which has been described with reference to FIGURE 5 and comprises the monostable trigger switch 113. A capacitive element 114 is used in which the capacitance may be set to different fixed values, i.e. 10 pf., 100 pf. and 600 pf.

In the first two examples described below a spark electrode system 91 is used in which the electrodes 87 and 88 consist of silicon doped with 0.1% by weight of phosphorus (FIGURE 4). The spark gap between the electrodes is 8 mms. The silicon support 153 (FIG. 6) in both examples consists of p-type silicon. Phosphorus is added to the hydrogen-siliconchloride gas mixture by means of spark discharges between the electrodes with a pulse frequency of 180 pulses per second.

In the first of these examples the capacitive element 114 (FIG. 5) is set at a capacitance of 100 pf. The resistivity of the deposited n-type silicon 155 (FIG. 6) is about 1.3 ohm-cm.

In the second of these examples the capacitive element is set at a capacitance of 600 pf., the resistivity of the deposited n-type silicon being 0.3 ohm-cm.

In the next examples the silicon support 153 (FIG. 6) consists of n-type silicon for depositing a p-type silicon layer 155 on it. In these examples the spark electrode system 91 comprises electrodes 87 and 88 consisting of lanthanumboride ($LaB_6$), which is sufficiently conducting to carry the current of the spark discharges. (FIG. 4). The spark gap between the electrodes 87 and 88 is 8 mms.

In the next table the resistivity values of the p-type silicon deposited on the n-type silicon support 153 (FIGURE 6) are given in ohm-cms. when using the capacitance values of the capacitive element 114 (FIGURE 5) and the pulse frequencies of the spark discharges as indicated.

TABLE

| Pulse frequency in pulses per sec. | Capacitance in pf. | | |
|---|---|---|---|
| | 10 | 100 | 600 |
| 2 | ---------- | 3 | 0.2 |
| 20 | 2.3 | 0.3 | 0.04 |
| 180 | 0.6 | 0.07 | 0.014 |

The table shows clearly that the resistivity decreases when increasing the capacitance of the capacitive element shunting the electrodes of the spark electrode system and increasing the the pulse frequency of the spark discharges between the electrodes.

It should also be remarked that other parameters may have an influence on the resistivity, such as the composition of the spark electrodes comprising a special doping agent. Thus when indiumphosphide (InP) is used as the material of the spark electrodes instead of silicon with 0.1% phosphorus in the above described methods of depositing phosphorus-doped silicon, the resistivities of the silicon in general would be lower. Variation of the content of the volatile semiconductor compound in the gas mixture will also influence the resistivity of the semiconductor material which is deposited. It is clear that an increase of this content in the processes described with reference to FIGURE 1 will tend to increase the resistivity. However, it was found that increasing the content of silicon tetrachloride of the gas mixture used in the method described with reference to FIGURE 2 tends to produce a substantial decrease of the resistivity of the deposited doped silicon.

In general the last mentioned parameters may readily be kept at a fixed value, so that the resistivity of the treated or deposited material is controlled by the pulse frequency and the shunting capacitance of the generator for the spark discharges.

Figure 3:
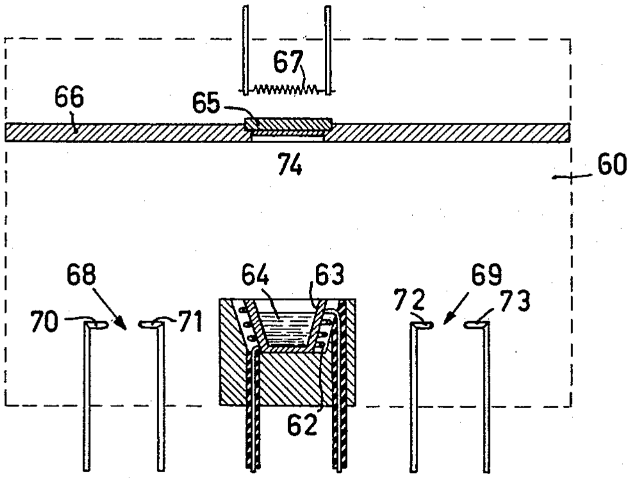

Alternatively, by means of spark discharges across a spark electrode system containing the doping material this material may be evaporated in small amounts in a vacuum, the vapour particles formed acting upon a semiconductor. FIGURE 3 diagrammatically shows a device in which on a support consisting, for example, of a member of monocrystalline semiconductor material, doped semiconductor material may be deposited from the vapour state in a vacuum, doping materials being vaporized by spark discharges across one or more spark electrode systems and simultaneously being deposited on the support. In FIGURE 3 a chamber 60 adapted to be evacuated by means not shown is indicated schematically by broken lines, which chamber contains a heating block 61 which may consist, for example of tantalum and is adapted to be heated by means of an insulated resistance wire 62 connected to a variable current source (not shown) external to the chamber 60. A crucible 63 of refractory material, for example, of graphite containing a semiconductor 64, for example germanium or silicon to be deposited from the vapour phase, is arranged in a recess of the heating block. A support 65, for example, a disc of monocrystalline semiconductor material, for example, germanium or silicon, is arranged on a support 66 above the crucible 63. The support 65 may be heated by means of a heating helix 67 connected to a current source (not shown) external to the chamber 60. On each side of the heating block 61 is disposed a spark electrode system 68, 69 respectively, the electrodes 70, 71 and 72, 73 respectively of the spark electrode systems containing doping materials. For example, the electrodes 70 and 71 may consist of antimony and the electrodes 72 and 73 of aluminum. The electrodes of each spark electrode system are connected to a generator (not shown) of pulsatory voltages of adjustable frequency, for example, of the type described hereinbefore with reference to FIGURE 5. The support 65 may be heated by means of the heating helix 67 to a temperature suitable for the process of deposition from the vapour phase but lower than the melting point of the material of the support and of the semiconductor to be deposited from the vapour phase. After evacuation of the chamber 60, the resistance wire 62 is energized so that the heating block 61 and the crucible 63 are heated to a temperature such that the semiconductor 64 melts and consequently evaporates, a layer 74 of semiconductor material being deposited on the support 65. The spark electrode systems are disposed so that particles evaporated from the molten semiconductor which travel along straight paths starting from the molten semiconductor, cannot be deposited on the electrodes of the spark electrode systems since the crucible 63 and the heating block 61 screen the spark electrode systems. During the process of deposition from the vapour phase spark discharges may be produced, for example, across one of the spark electrode systems, with the result that small amounts of doping material of this spark electrode system are vaporized and a small amount of this doping material is incorporated in the semiconductor being deposited on the support. When the electrodes 70 and 71 contain a donor and the electrodes 72 and 73 contain an acceptor, spark discharges may alternately be produced across the spark electrode system 68 and across the spark electrode system 69 so that alternate layers of opposite conductivity types are deposited on the support. The conductivity of such layers depends upon the frequency of the pulse discharges between the electrodes of each spark electrode system.

Obviously in such a process of deposition from the vapour phase in a vacuum several spark electrode systems having electrodes consisting of the same material may be used, for example, in the manner described hereinbefore.

Although the embodiments described by way of example only relate to the deposition of doped semiconductor material on a support, the invention obviously may also be applied to other methods of doping semiconductors, as has been mentioned hereinbefore, without departing from the scope of the present invention.

The present invention permits the manufacture of bodies of semiconductor material in which the doping with one or more doping materials and the distribution thereof may be accurately adapted to the desired properties of semi-conductor devices including such bodies, such as transistors, diodes, photo-cells and more complex miniature circuit elements built up from a single semiconductor body which contain parts having different functions and are referred to in the literature as "solid circuits."

It should further be noted that it is known that not only elementary semiconductors, such as germanium and silicon, but also semiconductive compounds, such as compounds of the type $A^{III}B^{V}$, may be deposited on a support, for example, by decomposition of volatile compounds of the components or by deposition from the vapour phase. It will be appreciated that in order to dope such semiconductive compounds during their deposition doping materials may be incorporated by the use of the invention. Another example of a semiconductive compound which may be formed by decomposition of gaseous compounds of the components is silicon carbide, in which, for example, boron may be incorporated with the use of the invention.

It will also be appreciated that the present invention permits a particularly flexible and accurate adjustment and, if desired, variation of the concentration of the incorporated doping materials, especially with respect to the minute concentrations generally desired in semiconductor technology.

What is claimed is:

1. A method of producing doped semiconductor material, comprising providing a spark discharge system having at least two electrodes, at least one of said electrodes containing a doping material capable when incorporated in a semiconductor of modifying its properties, applying a potential across the said electrodes causing spark discharges to occur between the electrodes forming a vapor or gas containing doping material from the said electrode, and bringing the said doped vapor or gas into contact with a body of semiconductive material to incorporate same therein.

2. A method as set forth in claim 1 wherein a plurality of potential pulses at a given frequency are applied across the said electrodes, said pulses having magnitudes capable of producing multiple spark discharges between the electrodes, and the concentration of the doping material in the vapor or gas is controlled by controlling the frequency of the applied potential pulses.

3. A method of producing doped semiconductor material, comprising passing a gas through a device capable of forming a volatile semiconductor compound to form a first gas stream containing a gas or vapor of the semiconductor compound, passing said gas stream between electrodes of a spark discharge system, at least one of which electrodes contains a doping material capable of modifying a property of the said semiconductor when incorporated therein, while applying voltage pulses across said electrodes causing pulsatory spark discharges across the electrodes to incorporate in said gas stream a gas or vapor of said doping material, and leading the doped gas stream over a heated monocrystalline semiconductor substrate to cause the volatile semiconductor compound to decompose forming on the substrate a layer of substantially monocrystalline semiconductor material doped with an amount of said doping material dependent upon the frequency of said voltage pulses.

4. A method of producing doped semiconductor material, comprising passing a gas through a device capable of forming a volatile semiconductor compound to form a first gas stream containing a gas or vapor of the semiconductor compound, passing a gas between electrodes of a spark discharge system, at least one of which electrodes contains a doping material capable of modifiying a property of the said semiconductor when incorporated therein, while applying voltage pulses across said electrodes causing pulsatory spark discharges across the electrodes to form a second gas stream containing a gas or vapor of said doping material, combining the first and second gas streams, and leading the combined gas streams over a heated monocrystalline semiconductor substrate to cause the volatile semiconductor compound to decompose forming on the substrate a layer of substantially monocrystalline semiconductor material doped with an amount of said doping material dependent upon the frequency of said voltage pulses.

5. A method as set forth in claim 4 wherein the gasses initially passed through the semiconductor compound forming device and the doping material forming system are of hydrogen.

6. Apparatus for doping semiconductor material comprising: means for housing and supporting semiconductive material and means for heating said material, means for evacuating the housing, and means accessible to the housing for generating a gas or vapor of a doping material capable of altering a property of said semiconductor when incorporated therein, said last-named means comprising a spark discharge system including a pair of spark electrodes, at least one of which contains said doping material, and means for generating and applying voltage pulses across the electrodes capable of establishing pulsatory spark discharges at the electrodes generating a gas or vapor of the doping material at the electrodes which comes into contact with the semiconductor.

7. Apparatus as set forth in claim 6 including means for controlling the voltage pulses to control the concentration of the doping material in the gas or vapor.

8. Apparatus for doping semiconductor material comprising: means for heating and supporting semiconductor material, means for generating a gas or vapor of a doping material capable of altering a property of said semiconductor when incorporated therein, said last-named means comprising a spark discharge system including a pair of spark electrodes, at least one of which contains said doping material, means for flowing a gas past the electrodes, and means for generating voltage pulses and applying them across the electrodes, said voltage pulses being capable of establishing pulsatory spark discharges at the electrodes generating a gas or vapor of the doping material at the electrodes which is entrained in the gas stream, and means for bringing the doped gas stream into contact with the semiconductor material.

9. Apparatus as set forth in claim 8 wherein the voltage pulse generating means includes means for varying the frequency at which the pulses are generated.

10. Apparatus as set forth in claim 8 wherein the voltage pulse generating means includes means for discharging the electrodes after each spark discharge.

11. Apparatus as set forth in claim 8 wherein the voltage pulse generating means includes a capacitor connected in parallel with the said electrodes, the value of said capacitor determining the doping material concentration entrained in the gas stream.

12. Apparatus as set forth in claim 8 wherein said one electrode comprises in addition to the doping material a quantity of said semiconductor material.

13. Apparatus as set forth in claim 8 wherein said one electrode contains a compound of the doping material.

14. Apparatus as set forth in claim 8 wherein said one electrode consists essentially of an electrically conductive compound of the doping material.

15. Apparatus as set forth in claim 8 wherein the said one electrode an electrically conductive core with a coating of said doping material.

16. Apparatus as set forth in claim 8 wherein the gas flowed past the electrodes comprises at least one constituent capable of forming a volatile compound with the doping material.

17. Apparatus as set forth in claim 16 wherein the one constituent is hydrogen, a halogen, or a halogen compound forming a volatile hydride or halide with the doping material.

18. Apparatus as set forth in claim 17 wherein the said one electrode includes at least one doping material selected from the group consisting of boron, arsenic, phosphorus, antimony, aluminum, and an arsenic or phosphide of one of the metals aluminum, gallium and indium.

19. Apparatus as set forth in claim 8 wherein at least two spark discharge systems are included each capable of generating a gas or vapor of a doping material, each of said systems containing an electrode comprising a doping material.

20. Apparatus as set forth in claim 19 wherein the voltage pulse generator for each spark discharge system includes a capacitor connected in parallel with the electrodes, said capacitors having different capacitance values.

21. Apparatus as set forth in claim 19 wherein the electrodes of the two systems comprise different electrode materials, one of said doping materials being an acceptor and the other being a donor.

22. Apparatus as set forth in claim 8 wherein the gas flowed past the electrodes comprises a volatile compound of at least one constituent of the semiconductor.

23. Apparatus for growing doped semiconductor material comprising: means for supporting a monocrystalline semiconductive substrate and means for heating said substrate; means for generating a first gas stream containing a heat-decomposable semiconductor compound; means for generating a gas or vapor of a doping material capable of altering a property of said semiconductor when incorporated therein, said last-named means comprising a spark discharge system including a pair of spark electrodes, at least one of which contains said doping material, means flowing a gas past the electrodes to form a second gas stream, and means for generating and applying voltage pulses across the electrodes capable of establishing pulsatory spark discharges at the electrodes generating a gas or vapor of the doping material at the electrodes which is entrained in the second gas stream; and means for bringing both the first and second gas streams into contact with the semiconductive substrate causing the compound to decompose and the semiconductor to deposit on the substrate and grow thereon to form a layer of the same orientation as the substrate, which layer is doped with the doping material in an amount dependent on the frequency of the voltage pulses.

24. Apparatus as set forth in claim 23 wherein the voltage pulse generating means includes means for discharging the electrodes after each pulse is generated.

References Cited

UNITED STATES PATENTS

| | | | |
|---|---|---|---|
| 2,616,843 | 11/1952 | Sheer et al. | 204—164 |
| 2,763,581 | 9/1956 | Freedman | 148—175 |
| 2,789,068 | 4/1957 | Maserjian | 148—180 |
| 2,845,894 | 8/1958 | McIllvaine | 148—174 |
| 2,895,858 | 7/1959 | Sanqster | 148—175 |
| 2,921,892 | 1/1960 | Casey | 204—164 |
| 3,065,391 | 11/1962 | Hall | 148—175 |
| 3,099,614 | 7/1963 | Sheer et al. | 204—164 |
| 3,162,526 | 12/1964 | Vanik | 148—174 |
| 3,234,051 | 2/1966 | Kiffer et al. | 75—10 |

HYLAND BIZOT, *Primary Examiner.*

DAVID L. RECK, *Examiner.*

N. F. MARKVA, *Assistant Examiner.*